United States Patent

Toy et al.

[11] 3,966,478
[45] June 29, 1976

[54] N,N-DIALKYL O,O-BIS(HALOALKYL)PHOSPHORAMIDATE FLAME RETARDANT

[75] Inventors: Arthur D. F. Toy, Stanford, Conn.; Kenneth L. Eilers, Irvington, N.Y.

[73] Assignee: Stauffer Chemical Company, Westport, Conn.

[22] Filed: July 21, 1972

[21] Appl. No.: 274,033

Related U.S. Application Data

[63] Continuation of Ser. No. 69,157, Sept. 2, 1970, abandoned.

[52] U.S. Cl. ........................ 106/15 FP; 260/2.5 AJ; 260/2.5 FP; 260/45.75 B; 260/45.9 NP; 260/959
[51] Int. Cl.² ............................................. C08J 3/20
[58] Field of Search ............... 106/15 FP; 260/959, 260/45.75 B, 45.9 R, 45.9 W, 2.5 AJ, 2.5 FP

[56] References Cited
UNITED STATES PATENTS

| | | | |
|---|---|---|---|
| 2,971,929 | 2/1961 | Glade | 260/21 |
| 3,531,550 | 9/1970 | Herber et al. | 260/959 |
| 3,584,085 | 6/1971 | Hartmann | 260/2.5 |
| 3,704,144 | 11/1972 | Toy et al. | 106/15 |

OTHER PUBLICATIONS
Journal of Applied Chemistry, vol. 14, No. 6, June, 1964, pp. 221 to 228, article by Arni et al.

*Primary Examiner*—V. P. Hoke
*Attorney, Agent, or Firm*—Paul J. Juettner

[57] ABSTRACT

Fire resistant polymer compositions containing, as fire-retardant, N,N-dialkyl, O,O'-bis(haloalkyl)phosphoramidates. Polymers include urethanes, rayon and cellulose acetate.

8 Claims, No Drawings

N,N-DIALKYL O,O-BIS(HALOALKYL)PHOSPHORAMIDATE FLAME RETARDANT

This is a continuation of application Ser. No. 69,157 filed Sept. 2, 1970 now abandoned.

The present invention relates to new fire-retardant polymer compositions containing, as fire retardants, halogen containing phosphoramidate compounds. These compounds, which can be termed N,N-dialkyl O,O'-bis(haloalkyl)phosphoramidates, are particularly useful as fire retardant agents in polyurethanes, rayon and cellulose acetate.

BACKGROUND OF THE INVENTION

Phosphoramidates such as:

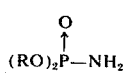
(I)

are known compounds and have been used as fire retardant compounds for polyurethane polymers (U.S. Pat. No. 3,240,729). These compounds are reactive flame retardants, e.g. reactive with the chemicals used to form the polyurethanes. The compounds of the patent (I) are reactive due to the presence of the amino hydrogen atoms, the presence of which is desirable for that purpose.

However, these compounds (I) are not stable to caustic solution. These compounds (I) are therefor undesirable for use as flame retardants in connection with polymer systems requiring a caustic solvent system such as viscose rayon fiber spinning solutions.

It has now been found that fire retardance can be provided by the incorporation of alkali stable N,N-dialkyl O,O'-bis(haloalkyl)phosphoramidates, as flame retardant agents, in numerous polymer compositions.

THE INVENTION

In accordance with the present invention, fire-resistant polymer compositions are provided by incorporating in the polymers, as fire retardant agent, N,N-dialkyl O,O'-bis(haloaklyl) phosphoramidates of the formula:

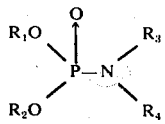

wherein $R_1$ and $R_2$ are the same or different haloalkyl radicals having from 2 to 4 carbon atoms, the halo group being chloro or bromo and wherein $R_3$ and $R_4$ are the same or different alkyl radicals of from 1 to 4 carbon atoms. These compounds have been found to be non-reactive and stable to strong aqueous caustic solutions. Polymer systems included within the scope of the present invention are polyurethanes, cellulosics and modified cellulosics, polyvinylhalides, and particularly those containing a high plasticizer content, polyolefins, polyesters, acrylics, polyethers, polyacetals, epoxies, phenolics, rubber and the like.

The compounds for use in the present invention are N,N-dialkyl O,O'-bis(haloalkyl) phosphoramidates of the formula:

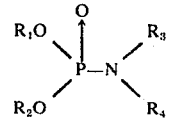

wherein $R_1$ and $R_2$ can be the same or different haloalkyl radicals having from 2 to 4 carbon atoms, the halo group being chloro or bromo, and illustrated by chloroethyl, chloropropyl, chlorobutyl, the corresponding bromine substituted radicals and isomeric forms of the halopropyl and halobutyl radicals; and $R_3$ and $R_4$ can be the same or different alkyl radicals having from 1 to 4 carbon atoms such as methyl, ethyl, propyl, isopropyl, butyl, and isobutyl. The haloalkyl compounds can be monohalo or polyhalo substituted compounds as desired. The amount of halo group substitution is limited by the number of replaceable hydrogen atoms present on the alkyl group and also by chemical factors such as steric hindrance, solubility, and hydrolytic stability, particularly in some of the isomeric forms of the stated alkyl groups. The halo groups attached to the alkyl radical can be the same or different and can be attached to any position on the carbon chain, the positioning also being limited by the above noted chemical factors including steric hindrance. Preferably, $R_3$ and $R_4$ are methyl.

A particularly preferred group of compounds are the 2,3-dihalopropyl compounds. These compounds of the present invention can be easily prepared by halogenating (chlorinating or brominating) diallyl N,N dialkyl phosphoramidate. The methods for halogenating allyl containing phosphorus compounds are well known in the prior art and can be illustrated by those set forth in U.S. Pat. No. 2,574,515. The diallyl N,N dialkyl phosphoramidate can be easily prepared by reacting diallyl hydrogen phosphonate with dialkyl amine in the presence of a carbon tetrachloride. The reaction between the amine and the phosphonate in the presence of carbon tetrachloride is basically the Todd reaction. The Todd reaction is well known in its basic form which is set out in the literature article by Atherton, Openshaw and Todd, *J. Chem. Soc.*, 1945, page 660 (London, 1945) and also in Belgium Patent 649,879 issued in 1964, the disclosures of which are hereby incorporated by reference.

Illustrative of those 2,3-dihalopropyl compounds which are within the scope of the invention are:

1. bis(2,3-dichloropropyl)N,N-dimethyl phosphoramidate
2. bis(2,3-dibromopropyl)N,N-dimethyl phosphoramidate
3. bis(2,3-dichloropropyl)N,N-diethyl phosphoramidate
4. bis(2,3-dichloropropyl)N-methyl,N-ethyl phosphoramidate
5. bis(2,3-dibromopropyl)N,N-dibutyl phosphoramidate Compounds within the scope of the present invention can also be prepared directly by reacting the appropriate halo-substituted diester of phosphonic acid with a secondary amine in the presence of carbon tetrachloride to obtain the desired phosphoramidate in accordance with the Todd reaction.

The Todd reaction is given only as illustrative of a synthetic route which can be used to prepare the compounds of the present invention and it is intended that the present invention not be limited thereto. Illustrative of the secondary amine reactants which can be used in the Todd reaction are: dimethylamine, dipropylamine, dibutylamine, diisopropylamine, diisobutylamine, methylethylamine, ethylpropylamine, propylbutylamine, methylbutylamine and the like.

Illustrative of the diesters of phosphonic acid which can be used in addition to the diallyl hydrogen phosphonate are bis($\beta$-chloroethyl)phosphonate; bis(2-chloro-n-propyl)phosphonate; bis(chlorobutyl)phosphonate; [2-(1-chloropropyl) [2-(1,3-dichloropropyl)]phosphonate; [2-chloroethyl] [2-(1,3-dichloropropyl)] phosphonate. The foregoing are given as illustrative of some of the chloroalkyl phosphonates which can be used to prepare compounds for use in the present invention. Equally useable are the corresponding bromoalkyl phosphonate reactants. Mixed chlorobromo alkyl phosphonate reactants can also be used.

Another means of preparing compounds for use in the present invention is by the reaction of an oxirane compound such as ethylene oxide, propylene oxide or butylene oxide with a phosphoramidic dihalide. The method is not limited to the use of 1,2-oxirane compounds as any such compounds can be used. Halo substituted oxiranes such as the epihalohydrins are particularly effective for preparation of bis[2-(1,3-dihaloalkyl)]N,N-dialkyl phosphoramidates by the reaction of epihalohydrin and N,N-dialkyl phosphoramidic dihalide. Epihalohydrins which can be utilized are illustrated by epichlorohydrin and epibromohydrin. Other oxirane compounds of the formula:

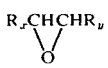

wherein $R_x$ and $R_y$ can be alkyl or haloalkyl (Cl or Br) can be used.

Illustrative of bis[2-(1,3-dihaloalkyl)] N,N-dialkyl phosphoramidates which are within the scope of the present invention are:

1. bis[2-(1,3-dichloropropyl)]N,N-dimethyl phosphoramidate
2. bis[2-(1-bromo-3-chloropropyl)]N,N-dimethyl phosphoramidate
3. bis[2-(1,3-dibromopropyl)]N,N-dimethyl phosphoramidate Reaction conditions for preparing the compounds of the present invention are readily ascertainable by one skilled in the art and further illustration can be obtained in the specific examples of this application.

These phosphoramidate compounds discussed above in combination with a polyurethane provide outstanding flame resistance polyurethane formulations and particularly foams. The phosphoramidates may be used individually or in various mixtures in the urethane foams to produce flame resistant products.

The production of urethane or isocyanate polymers is a well known commercial process [see: for instance, Kirk-Othmer, *Encyclopedia of Chemical Technology*, (hereinafter K-O) First Supplement, pages 888 et seq., Interscience 1957], the material of which is hereby incorporated by reference. Briefly, this process involved the reaction of an isocyanate and a second compound which may contain hydroxyl, amino or carboxy groups, i.e., a compound containing active hydrogen atoms. A preferred group of compounds containing active hydrogen atoms are the di- or polyfunctional hydroxy compounds. The most common polymers are formed by the reaction of toluene diisocyanate (hereinafter TDI) and a saturated polyester polyol. Representative polyester polyols are the reaction products of adipic acid and/or phthalic anhydride and ethylene glycol. Other compounds which may be used in place of the polyesters are polyether polyols, simple glycols, polyglycols, caster oil, drying oils, etc. The degree of cross-linking in the polyurethane which is dependent on the type of polyol used dictates whether the products are to be flexible or rigid. The compounds as disclosed in this invention are suitable for use in either flexible or rigid foams.

When an expanded on foamed product is to be produced, a "foaming agent" is used such as water or inert materials such as halohydrocarbons which cause the reaction products to form an expanded foam.

The phosphoramidate compounds are also useful in preparing cellulosic fire-retardant compositions which are broadly defined as any product which includes or is based on the compound cellulose (a carbohydrate polymer composed of anhydroglucose units having the empirical formula $C_6H_{10}O_5$). A complete discussion of cellulose and its derivatives is set out in K-O, Encyclopedia of Chemical Technology, 2nd Ed., Volume 4, page 593 et seq. (19). Cellulosics includes wood, in raw form as well as pulp, fiber board, and wood fibre. Also included within the term cellulosics are natural cellulose containing fibers of animal or vegetable origin as distinct from that obtained from trees. Thus, cotton and wool are also included within the scope of the present invention.

Modified celluloses such as cellulose acetate and rayon can also be flame retardant in accordance with the present invention. Cellulose acetate, or "acetate" includes "a manufactured fiber in which the fiber-forming substance is cellulose acetate where not less than 92% of the hydroxyl groups are acylated. The term 'triacetate' may be used as a generic description of the fibers." (Federal Trade Commission Definition). These products and their processes for preparation are well known to one skilled in the art (K-O, 2nd, Vol. 1, page 109 et seq.).

Also included within the scope of the invention is rayon which has been defined by the Federal Trade Commission as a munufactured fiber composed of regenerated cellulose in which substituents have replaced not more than 15% of the hydrogens of the hydroxyl groups. The processes for preparing rayons are well known to one skilled in the art (K-O, 2nd, Vol. 17, page 168 et seq.). Included in the term "rayon" are the viscose rayons, the nitrocellulose rayons, and the cupraammonium rayons.

Olefin polymers are also included within the scope of the present invention. Olefin polymers are prepared by the addition polymerization of ethylenically unsaturated monomer materials of the formula:

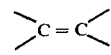

the remaining free valence bonds being satisfied with hydrogen (ethylene), and alkyl groups (propylene, butylene (1,2; or 2,3), pentene (1,2; or 2,3); and the like). There is essentially no limit to the length of the carbon chain as long as the ethylenically unsaturated group is not sterically hindered and is polymerizable to form an olefin polymer. Olevins in addition to those mentioned include 1-hexene, 1heptene, 1 or 2 octene and the like. Also included within the term olefin polymers are copolymers of the olefin-olefin type as well as the olefin diolefin type. Copolymers of olefins with a minor proportion, e.g. less than 50% of a vinyl or acrylic type monomer are understood to be included in the term olefin polymers. A more complete discussion of the olefin polymers and their copolymers as well as methods of preparation can be found in K-O, 1st ed, Vol. 1, pp. 938–959; First Supplement Vol. pp. 699–712, 2nd ed. Vol. 14, pp. 217–334 and Vol. 7, pp. 676–715.

The present invention also includes the use of both natural and synthetic rubbers such as SBR (Styrene-Butadiene-Rubber). This is more fully covered in the reference K-O, 2nd ed. Vol. 7, pp. 676–715 cited above.

The epoxy polymers useable in the present invention can be defined as a polymer compound having a plurality of vicinal groups.

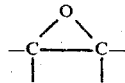

these compounds may be saturated, or unsaturated, aliphatic, cycloaliphatic, aromatic or heterocyclic and may be substituted if desired, with such non-interfering substitutents as chlorine, hydroxyl, ether radicals and the like. The compounds are more fully described in the extensive discussion of epoxides in U.S. Pat. No. 3,278,477.

Polyesters included within the scope of the present invention may be defined as heterochain macromolecular compounds having a plurality of carboxylate ester (—CO.O—)-groups as components of their skeletal structures. Polyesters are thus distinguished from other ester-containing polymers such as the cellulose esters, polyacrylates, and the poly(vinyl esters) in which the carboxylate group is pendant from the backbone rather than forming the backbone itself. The polyesters can be linear or branched having aliphatic and/or aromatic base compounds, saturated or unsaturated. The polyesters can be derived from self-esterification of hydroxy-carboxylic acids of by the interaction of diols (polyols) with dicarboxylic acids (and anhydrides). One of the more well known polyesters is the reaction product of a dihydric alcohol and terphthalic acid which is used for fiber formation. The most common polyester in use is that derived from the linear polymer polyethylene terephthalate (PET). A further and more complete discussion of polyester fibers and polyesters can be found in K-O, 2nd ed., Vol. 16, pp. 143–188 and Vol. 20, pp. 791–839.

Also included within the scope of the invention are the polyacrylics which included polymers of acrylic acid (CH$_2$=CHCOOH), methacrylic acid (CH$_2$=C(CH$_3$)COOH) and derivatives thereof. These derivatives include the esters, anhydrides, acid halidea of chlorine or bromine, alkali metal salts, amides, and nitrites. These are well known compounds and are illustrated in a dissertation on "Acrylic Acid and its Derivatives"

The polyvinyl acetals are also included within the scope of the invention. Polyvinyl acetals are the reaction product of polyvinyl alcohol and an aldehyde. These are well known polymers the most important of which is polyvinyl butyral as well as polyvinyl acetal itself.

Also included within the scope of the present invention are the phenolic resins. These resins can be defined as polymers resulting from the reaction of phenols with aldehydes. Although phenol is the dominant phenolic reactant, other like materials such as resorcinol, cresol, xylenol, p-tert-butylphenol and p-phenylphenol can be used. The aldehyde used most extensively is formaldehyde. A further discussion of these polymers and their method of preparation can be found in K-O, 2nd ed., Vol. 15, pp. 176–208

Also included within the scope of the present invention are polyethers. Polyethers in general have the linear structure —O.(R.O)$_n$R.O— wherein R is an alkylene or aryl interrupted or substituted alkylene wherein the alkylene group has from 1–4 carbons and n is a number representing the multiples of the bracketed group necessary to form polyether. The polyethers can be linear or branched as desired. Polyethers are usually prepared by reacting an alkylene oxide such as ethylene oxide with a polyhydric alcohol such as ethylene glycol. This reaction is well known as are the products prepared thereby. The products, termed polyalkylene glycols, include as their principle, and most well known representative, polyethylene glycol. Polypropylene glycol is also an extensively used polyether which can be treated in accordance with the invention. Included within the term "polyethers" are the glycerol and other polyol modified polyethers, as well as the polythioether derivatives. A more extensive discussion of these materials can be found in POLYMERS AND RESINS, Golding, D. Van Nostrand Company, Ltd. (1959) at pp. 352–360.

Vinyl polymers can also be utilized in accordance with the present invention. While some of the vinyl polymers such as the polyvinyl halides have inherent flame retardant properties, a flame retardant is needed to enhance the flame retardant properties of the compound polymer as the plasticizers which are normally used are flammable. Compounds disclosed in the invention insure the non-flammability of the compounded polymers. As used herein, the term polyvinyl polymers is intended to include polymers and copolymers prepared from one or more vinyl monomers.

Vinyl monomers can be illustrated by vinyl esters such as acetate; vinyl halide such as vinyl chloride and vinyl bromide; vinyl ethers such as vinyl ethyl ether, vinyl methyl ether, vinyl esters of halogenated carboxylic acids, such as vinyl chloroacetate. Also included within the term "vinyl monomers" are the aryl substituted vinyls such as styrene and alpha-methyl styrene and the halostyrenes such as chlorostyrene. Also included within the term polyvinyl polymers are the polyvinyl alcohol polymers, the vinylidene polymers which correspond to the polyvinyl halide polymers such as polyvinylidene chloride and polyvinylidene bromide as well as the copolymers of vinylidene chloride and vinylidene bromide. Comonomers which can be used are any ethylenically unsaturated monomer which is copolymerizable with the vinyl monomer such as styrene, the olefins and diolefins exemplified hereinbefore as well as the mono and dicarboxylic acids such as acrylic acid, methacrylic acid, maleic acid and its anhydride and fumaric acid as well as vinyl esters such as vinyl acetate, the alkyl acrylates and methacrylates such as ethyl acrylate, and methyl methacrylate and the like, as well as acrylonitrile. These are given as illustrative of the numerous copolymerizable compounds which can be used. Vinyl polymers and copolymers and their methods of preparation are more fully detailed in POLYMERS AND RESINS by Golding, D. Van Nostrand (1959) pp. 409 et seq. and particularly, for vinyl halides pp. 409–425. Vinyl halide polymers and the monomers copolymerizable therewith are also more fully set out in U.S. Pat. No. 3,278,477 beginning at Column 1, line 48 through Column 7, line 30.

The reference material referred to hereinbefore is intended to be incorporated into this specification by reference and Applicants do hereby incorporate such material.

Thus, numerous types of both synthetic and naturally derived polymer materials may be utilized in preparing fire retardant compositions using the fire retardant additives of the present invention.

All of the foregoing polymer systems are well known and each has extensive utilities well known to those skilled in the art. Some are useful as fiber formers, whereas others are used to mold or are extruded to form various objects. The compositions of the invention can also be used equally as well for these well known utilities.

The flame retardant additives can be used alone or in combination with other flame retardants. The flame retardants are incorporated in or on the polymer as is appropriate for the form of polymer used. The additives can be incorporated in blends which are used for extruding, milling injection molding and the like. The additives can be added to polymer solutions which are used to cast films. Also, the additives can be added to spinning solutions. The additive can also be coated onto preformed polymer shapes such as fiber batts, films, etc. This can be accomplished by padding, dipping, spraying (in an appropriate liquid medium) and the like. The fire retardant additives can be added to protective coatings generally applied to the exterior of a structure such as a polymer based paint. These are given only as illustrative of the numerous methods of preparing the compositions of the invention.

Effective flame retardancy and therefor the amount of flame retardant additive required is dependent on the polymer and the final blend of polymer and processing and stabilizing additives. In general, incorporation of the additive on or with the polymer of from 0.5% to about 40% by weight have been found to be effective. Preferably, the flame retardant additives are used in an amount of from about 2.5 to 20% by weight.

The invention will be further illustrated in the examples which follow.

EXAMPLE 1

Preparation of
bis(2,3-dichloropropyl)N,N-dimethylphosphoramidate 129.7 grams (0.625 mole) of bis[1-(2-propylidenyl)]N,N-dimethylphosphoramidate was admixed with 700 milliliters methylene chloride and the mixture was treated with chlorine gas over a 2 hour period. The temperature of the reaction mixture was maintained at a low level using a dry ice-methanol bath. The temperature of the reaction mixture was then allowed to return to room temperature while purging the solution with nitrogen. Any P—Cl bonds which might have been formed from the amidate and HCl forming P—Cl bonds were returned to the amidate by reacting the product with dimethyl amine. Sodium thiosulfate was then added to the reaction mixture to remove any free chlorine (neutral starch-iodide paper test). The reaction mixture was made basic with sodium carbonate and sodium hydroxide (10% solution) and the reaction mixture separated into layers. The product layer was separated and water washed. The product was then washed three times with 200 milliliters methylene chloride. The methylene chloride layer was then washed until neutral. Methylene chloride was stripped from the product and the product was washed again while in the carbon tetrachloride. 172.8 grams (0.495 mole) of product was isolated (79% yield). A portion of the product was then treated with charcoal in 2 equal volumes of carbon tetrachloride and passed through a filter bed of alumina, neutral activity grade 1. The filtered sample was recovered and vacuum purified. The nuclear magnetic resonance spectrum identified the product as bis(2,3-dichloropropyl)N,N-dimethylphosphoramidate.

EXAMPLE 2

Preparation of
bis(2,3-dichloropropyl)phosphoramidate)

Utilizing the process of Example 1, 161.5 grams (0.9 mole) of $(CH_2=CHCH_2O)_2P(O)NH_2$ was reacted with 130 grams (1.8 moles) chlorine to obtain the desired product.

EXAMPLE 3

Preparation of
bis(2,3-dibromopropyl)N,N-dimethylphosphoramidate

The bis(2,3-dibromopropyl)N,N-dimethylphosphoramidate was prepared using bromine in place of chlorine in the procedure of Example 1. The product was identified by infrared spectroscopy.

EXAMPLE 4

Preparation of bis
O.O'(2,3-dibromopropyl)phosphoramidate

Following the procedure of Example 2 using bromine instead of chlorine, bis O,O'(2,3-dibromopropyl)phosphoramidate as identified by infrared spectroscopy was prepared.

EXAMPLE 5

Preparation of
bis[2-(1,3-dichloropropyl)]N,N-dimethylphosphoramidate 121 grams (0.747 mole) of N,N-dimethylphosphoramidic dichloride $(CH_3)_2N—P(O)Cl_2$ was reacted with 148 grams (1.6 mole) of epichlorohydrin in the presence of 2 grams titanium tetrachloride using 500 milliliters of carbon tetrachloride as solvent. The product [2-(1,3-dichloropropyl)]N,N-dimethylphosphoramidate was identified by infrared and nuclear magnetic resonance spectra analytical techniques.

EXAMPLE 6

Preparation of
bis[2-(1-bromo-chloropropyl)]N,N-dimethylphosphoramidate 81 grams of N,N-dimethylphosphoramidic dichloride and 144 grams (1.05 mole) of epibromohydrin were reacted together in the presence of 2 grams of titanium tetrachloride in 500 milliliters of carbon tetrachloride, 135 grams of product (62% yield) as identified by infrared spectroscopy and nuclear megnetic resonance analytical techniques was obtained.

Using the above techniques, other phosphoramidates such as bis(chloroethyl)N,N-dimethylphosphoramidate, bis(chloroethyl)N,N-dipropyl phosphoramidate, bis[2(1,3-dichloropropyl)]N,N-diethyl phosphoramidate, bis (2,3-dibromopropyl)N,N-dibutyl phosphoramidate and the like can also be easily prepared. These compounds can be effectively utilized as flame retardant additive to prepare flame retarded polymer compositions.

The flame retardant compositions of the present invention are prepared and tested as follows:

Cellulose Acetate The flame retardant compositions of Examples 1 – 6 are mixed in a 20 weight percent solution of cellulose acetate in an 80/20 acetone/methanol solvent system. The solution is then cast into a 15 mil sheet, air dried for 1 hour, followed by an oven drying at 70°– 80° C. for about 1 hour. The fire retardant is used in such an amount that the final dry film contains a given percentage of fire retardant based on the dry weight of the acetate. Strips were then cut from the film and ignited in a bunsen burner flame.

Viscose Rayon Weighed samples of fire retardant of Examples 1 – 6 are dissolved in a solvent such as dichloromethane and known weights of viscose rayon staples are alternatively dipped into the solution and air dried until all the solution is consumed. The treated staples are then dried overnight, manually carded for homogenity and ignited in a bunsen burner flame.

The results of the flame retardancy tests are shown in Table I below along with hydrolysis resistance data. The flame retardancy results are visually noted as falling within four categories as follows:
  A. Flammable
  B. Barely Flammable
  C. Partially self-extinguishing
  D. Self-extinguishing
Borderline results between two categories are reported by giving the two boundary categories.

with no loss of fire retardant properties when compared to their phosphoramidate homologues. Similiar results are obtainable using other polymer systems.

The invention is defined in the claims which follow. What is claimed is:

1. A fire retardant composition comprising, in intimate admixture, a polymeric material selected from the group consisting of polyurethanes, cellulosics, polyolefins, polyesters, vinyl polymers, polyacrylics, polyethers, polyacetals, polyphenolics, and rubber in combination with and as a fire retardant therefor, a haloalkyl N,N-dialkylphosphoramidate selected from the group consisting of 2,3-dihalopropyl N,N dialkylphosphoramidates and 2-(1,3-dihalopropyl) N,N-dialkylphosphoramidates wherein said halo substituent is selected from the group consisting of chloro and bromo, and the alkyl group attached to said "N" being an alkyl radical of from 1 to 4 carbon atoms.

2. A fire retardant composition as recited in claim 1 wherein said polymeric material is a polyurethane.

3. A fire retardant composition as recited in claim 1 wherein said halo substituent is bromo.

4. A fire retardant composition as recited in claim 1 wherein said alkyl groups attached to said "N" are methyl.

5. A fire retardant composition as recited in claim 1 wherein said fire retardant is a 2,3-dihalopropylphosphoramidate.

6. A fire retardant composition as recited in claim 1 wherein said fire retardant is selected from the group consisting of bis(2,3-dichloropropyl)N,N-dimethyl phosphoramidate, bis(2,3-dibromopropyl)N,N-dimethyl phosphoramidate, bis[2-(1,3-dichloropropyl)]N,N-dimethyl phosphoramidate and bis[2-(1,3-dibromopropyl)]N,N-dimethyl phosphoramidate.

7. A fire retardant composition as recited in claim 1 wherein said polymeric material is a cellulosic of the viscose rayon or cellulose acetate type.

8. In a process for preparing fire retardant polymer compositions which comprise, in intimate admixture, a polymer selected from the group consisting of polyurethanes, cellulosics, vinyl polymers, polyolefins, polyes-

TABLE I

| COMPOUND STRUCTURE | HYDROLYSIS (Resistance) | VISCOSE RAYON GRAMS OF FLAME RETARDANT | | | CELLULOSE ACETATE % FLAME RETARDANT | | | |
|---|---|---|---|---|---|---|---|---|
| | | 0.15 | 0.30 | 0.60 | 2.5% | 5.0% | 10% | 12% |
| (CH₂ClCHClCH₂O)₂PN(CH₃)₂ with O↑ | Good | B | B/C | D | B | C | C/D | D |
| (CH₂ClCHClCH₂O)₂PNH₂ with O↑ | Unstable Caustic | — | — | — | — | B | C/D | — |
| (CH₂BrCHBrCH₂O)₂PN(CH₃)₂ with O↑ | Good | — | — | — | — | C/D | D | — |
| (CH₂BrCHBrCH₂O)₂PNH₂ with O↑ | Unstable Caustic | — | — | — | — | C/D | C/D | — |
| [CH₂Cl)₂CHO]₂PN(CH₃)₂; with O↑ | Good | B/C | C | C | B/C | C | C/D | — |
| [CH₂Cl)(CH₂Br)CHO]PN(CH₃)₂ with O↑ | Good | — | — | — | D | D | D | — |

Key: Flame retardancy results
 A - Flammable
 B - Barely Flammable
 C - Partially Self-extinguishing
 D - Self-extinguishing As can be seen from the data of Table I, the compounds of the invention show better hydrolytic stability ters, polyethers, polyacetals, polyepoxies, polyphenolics, and rubber, and a fire retardant compound, the improvement which comprises adding, as said fire retardant an effective amount of a haloalkyl N,N-dialkylphosphoramidate selected from the group consisting of 2,3-dihalopropyl N,N dialkylphosphoramidates and 2-(1,3dihalopropyl) N,N-dialkylphosphoramidates wherein said halo substituent is selected from the group consisting of chloro and bromo, and the alkyl group attached to said "N" being an alkyl radical of from 1 to 4 carbon atoms.

* * * * *

UNITED STATES PATENT AND TRADEMARK OFFICE
CERTIFICATE OF CORRECTION

PATENT NO. : 3,966,478
DATED : June 29, 1976
INVENTOR(S) : Arthur D. F. Toy and Kenneth L. Eilers It is certified that error appears in the above-identified patent and that said Letters Patent are hereby corrected as shown below:

Column 5, line 62, please delete "halidea" and insert -- halides --;

Column 5, line 66, after Derivatives", please insert -- in Table 3, K-O, 2nd ed., Vol. 1, pp. 287-289, along with numerous other examples of acrylate ester compounds. The acrylate polymers such as polymethyl methacrylate are also well known. These polymers are discussed specifically in the aforementioned article beginning at page 303. --

Column 8, line 28, please delete "$(CH_2-CHCH_2O)_2P(O)NH_2$" and insert -- $(CH_2=CHCH_2O)_2P(O)NH_2$ Signed and Sealed this Nineteenth Day of April 1977

[SEAL]

Attest:

RUTH C. MASON
*Attesting Officer*

C. MARSHALL DANN
*Commissioner of Patents and Trademarks*